United States Patent

[11] 3,603,618

| [72] | Inventor | Michael K. Stratton<br>Peoria, Ill. |
|---|---|---|
| [21] | Appl. No. | 811,973 |
| [22] | Filed | Apr. 1, 1969 |
| [45] | Patented | Sept. 7, 1971 |
| [73] | Assignee | Caterpillar Tractor Co.<br>Peoria, Ill. |

[54] SEAL ASSEMBLY
7 Claims, 2 Drawing Figs.

[52] U.S. Cl. .................................................. 285/31,
                                                                   277/101
[51] Int. Cl. ........................................................ F16l 25/00
[50] Field of Search ............................................ 277/128,
                                147, 157, 138, 208, 237, 101; 285/31, 383

[56] References Cited
UNITED STATES PATENTS

| Re.22,713 | 1/1946 | Howe ............................ | 285/31 |
| 814,289 | 3/1906 | Hawley ......................... | 277/128 X |
| 1,671,161 | 5/1928 | Perks ............................ | 277/128 X |
| 2,695,794 | 11/1954 | Davis et al. .................. | 285/31 |

*Primary Examiner*—Robert L. Smith
*Attorney*—Fryer, Tjensvold, Feix, Phillips & Lempio ABSTRACT: A connector and seal assembly consisting of a ferrule within a rubber seal which, in turn, is surrounded by an adjustable band. Tightening of the band causes the rubber seal to be extruded outwardly from between the band and the ferrule.

PATENTED SEP 7 1971 3,603,618

INVENTOR
MICHAEL K. STRATTON

BY
*Fryer, Tjensvold, Feix, Phillips & Lempio*
ATTORNEYS

3,603,618

SEAL ASSEMBLY

BACKGROUND AND SUMMARY OF THE INVENTION

This invention generally relates to a combination seal and connecting member which is situated within a limited space between two adjacent components. More particularly, the invention comprises a device which connects and seals passages which are to be extended from one component to the other.

Many machines have two components located in adjacent positions, but separated by a gap due to design requirements. When such components have passages therein, such as for water, oil, air, etc., a means must be provided so that the passages may be interconnected and sealed.

Many current devices utilized to solve this problem require sleeves with O-rings on each end which fit into the passages. Some devices use an adapter which is bolted to one component and fitted into the passage in the other component. When such components are fixed in place with a space between them, it is often difficult to install or remove sleeves or adapters. An example of this can be found in the case of an engine having a plurality of adjacent cylinder heads mounted on a cylinder block. When the heads are bolted to the block in proper alignment with one another and a space between them, it is difficult to remove one cylinder head without disturbing the other when sleeves or adapters are utilized.

Therefore, it is an object of this invention to provide an improved connecting and sealing means which obviates each of the above described disadvantages of those means presently available in the art.

It is also an object of this invention to provide a connecting means which may be situated between adjacent faces of components having a space between them in such a way as to connect passages for uninterrupted flow of a fluid.

It is a further object hereof to provide such a device wherein the connecting member serves as a seal to prevent leakage of the fluid.

Other objects and advantages of the present invention will become apparent from the following description and claims as illustrated in the accompanying drawing which, by way of illustration shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION

Figure 1:
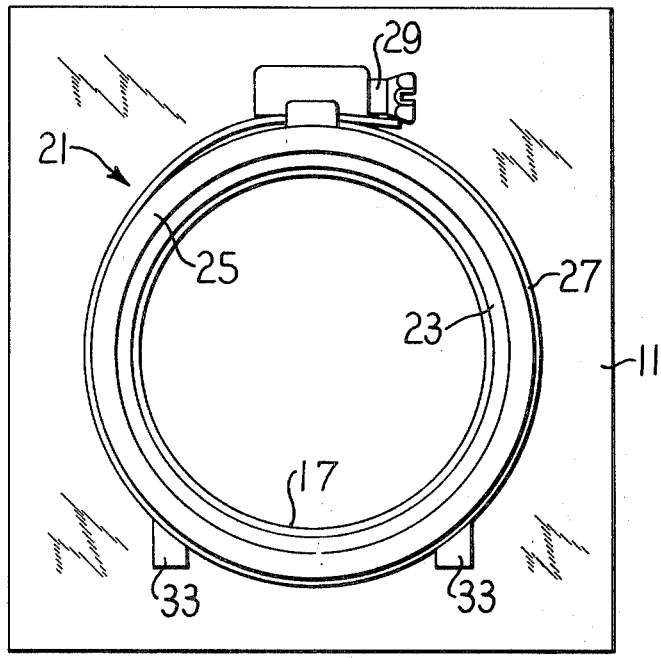
FIG. 1 is an end view of a component, showing the seal and connecting member of the present invention mounted against the component.

As shown in the drawing, a pair of components 11 and 13 are mounted on a base member 15. For example, if components 11 and 13 were adjacent cylinder heads, member 15 would be the cylinder block. As illustrated, each component has an aperture 17 in the wall thereof for the passage of a medium from one component to the other. Since, in many cases, a gap 19 exists between the components 11 and 13 due to design considerations, a sealing and connecting means, generally illustrated at 21, must be provided so as to connect the apertures 17 while preventing any escape of the medium being transferred.

The seal and connector of the present invention comprises a ferrule or tubular member 23 surrounded by a sealing device 25 which may be rubber or any other suitable material. In turn, the sealing device is surrounded by a commercially available adjustable band or clamp 27. Tightening the clamp 27 by means of the well-known worm-screw system 29 compresses the seal 25 against the ferrule 23, causing the seal to extrude axially against the adjacent faces of components 11 and 13, creating a seal therebetween.

Figure 2:
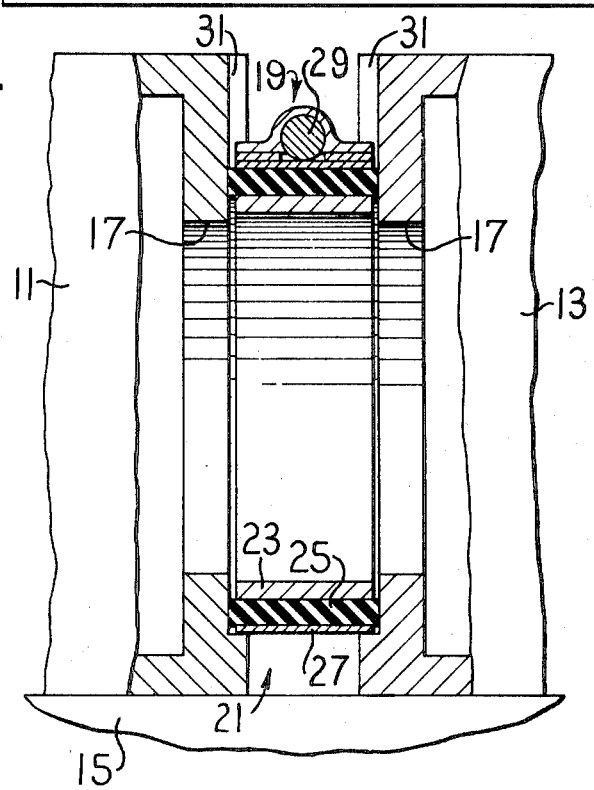
FIG. 2 is a side elevation, in cross section, of the device according to the present invention situated between a pair of components.

If desired, suitable means may be situated on either of both of the faces of components 11 and 13 so as to preposition the assembly relative to the apertures 17. As illustrated in FIG. 2, one example of such a prepositioning means comprises a slot 31 machined into either or both of the faces of the components. Another example of such a prepositioning means comprises a pair of bosses 33, as illustrated in FIG. 1, which may be formed as an integral part of either of both of the components.

Thus the Applicant has provided a seal and connecting means which produces a true advance in the art since either of the components between which the assembly is situated may be removed without disturbing the other. Further, the device embodies simplicity and economy in manufacture and maintenance. Although only one embodiment of the assembly has been described ans illustrated herein, it will be obvious to those skilled in the art that many alterations and modifications of the structure thereof may be made within the purview of the following claims.

1. In combination with two spaced-apart and substantially aligned conduits, at least one of which has a support means, a device comprising a tubular member having a longitudinal opening therethrough and defining a pair of open ends, said member being disposed with its open ends substantially aligned with said conduits and supported therebetween by said support means whereby fluid may pass therethrough from one conduit to the other, a sealing means around the outer periphery of said tubular member, and means for radially compressing said sealing means against said tubular member whereby said sealing means is extended beyond said ends into engagement with said conduits to provide a substantially fluid-tight passageway.

2. The device of claim 1 wherein the compressing means is an adjustable clamp.

3. The device of claim 1 wherein the support means comprises bosses on the at least one face.

4. The device of claim 1 wherein the support means comprises a slot on at least one conduit, into which the device may be placed.

5. The device of claim 1 wherein said sealing means comprises a rubber sealing element.

6. The device of claim 1 wherein said sealing means comprises a sealing element having a longitudinal dimension at least equal to that of the length of said tubular member.

7. The device of claim 6 wherein the comprising means is an adjustable clamp having a longitudinal dimension no greater than that of the length of said tubular member.